(12) United States Patent
Phaal et al.

(10) Patent No.: US 8,427,950 B2
(45) Date of Patent: Apr. 23, 2013

(54) METHOD, SYSTEM, AND COMPUTER PROGRAM PRODUCT FOR IDENTIFYING COMMON FACTORS ASSOCIATED WITH NETWORK THRESHOLD VIOLATIONS

(75) Inventors: Peter Phaal, San Francisco, CA (US); Stuart G. Johnston, San Francisco, CA (US)

(73) Assignee: InMon Corporation, San Francisco, CA (US)

( * ) Notice: Subject to any disclaimer, the term of this patent is extended or adjusted under 35 U.S.C. 154(b) by 121 days.

(21) Appl. No.: 11/846,357

(22) Filed: Aug. 28, 2007

(65) Prior Publication Data

US 2009/0059796 A1    Mar. 5, 2009

(51) Int. Cl.
    *H04L 12/26* (2006.01)
(52) U.S. Cl.
    USPC .......................................... 370/235; 709/224
(58) Field of Classification Search .................. 370/229, 370/230, 232, 233, 234, 235, 241, 248, 252, 370/253; 709/223, 224, 225, 230, 232, 235
See application file for complete search history.

(56) References Cited

U.S. PATENT DOCUMENTS

| | | | |
|---|---|---|---|
| 5,646,956 A | | 7/1997 | Pinna |
| 6,134,216 A | * | 10/2000 | Gehi et al. ................ 370/231 |
| 6,473,400 B1 | | 10/2002 | Manning |
| 6,807,156 B1 | | 10/2004 | Veras et al. |
| 6,970,425 B1 | * | 11/2005 | Bakshi ....................... 370/235 |
| 2002/0080808 A1 | | 6/2002 | Leung |
| 2003/0110007 A1 | | 6/2003 | McGee et al. |
| 2004/0003286 A1 | * | 1/2004 | Kaler et al. ................ 713/201 |
| 2005/0111367 A1 | * | 5/2005 | Chao et al. ................ 370/235 |
| 2005/0120013 A1 | | 6/2005 | Chang et al. |
| 2005/0120019 A1 | | 6/2005 | Rigoutsos et al. |
| 2005/0195834 A1 | * | 9/2005 | Kikuchi ..................... 370/396 |
| 2006/0075491 A1 | | 4/2006 | Lyon |
| 2006/0098585 A1 | * | 5/2006 | Singh et al. ............... 370/252 |
| 2007/0180096 A1 | * | 8/2007 | Roth et al. ................. 709/223 |
| 2009/0055420 A1 | | 2/2009 | Phaal et al. |

OTHER PUBLICATIONS

Non-Final Office Action for U.S. Appl. No. 11/842,850, mailed on Aug. 21, 2009, 17 pages.
Non-Final Office Action for U.S. Appl. No. 11/842,850, mailed on Apr. 7, 2010, 10 pages.
Final Office Action for U.S. Appl. No. 11/842,850, mailed on Dec. 8, 2010, 14 pages.
Advisory Action for U.S. Appl. No. 11/842,850, mailed on Jun. 17, 2011, 3 pages.
Non-Final Office Action for U.S. Appl. No. 11/842,850 mailed on Jul. 17, 2012, 14 pages.

* cited by examiner

*Primary Examiner* — Yemane Mesfin
*Assistant Examiner* — Khoa Huynh
(74) *Attorney, Agent, or Firm* — Ardeshir Tabibi; Kilpatrick Townsend & Stockton LLP (57) ABSTRACT

Disclosed are a method, system, and computer program product for identifying one or more common factors or causes which explain the one or more network threshold violations. In one embodiment, the method or the system identifies one or more network components within a network and then identifies which of the one or more network components is overloaded. The method or the system then identifies one or more simple factors for the identified network components where the one or more simple factors constitute one or more causes for overloaded network activity. The method or the system then determines a scaled composite weight for a simple factor to determine whether the scaled composite weight exceeds a second threshold. If certain simple factors are determined to exceed the second threshold, such simple factors are added to a list of common factors which are in turn stored in a tangible computer accessible medium.

11 Claims, 7 Drawing Sheets

METHOD, SYSTEM, AND COMPUTER PROGRAM PRODUCT FOR IDENTIFYING COMMON FACTORS ASSOCIATED WITH NETWORK THRESHOLD VIOLATIONS

CROSS REFERENCED AND RELATED APPLICATION

This application is cross-related to the U.S. patent application Ser. No. 11/842,850 which is entitled "METHOD, SYSTEM, AND COMPUTER PROGRAM PRODUCT FOR IDENTIFYING COMMON FACTORS ASSOCIATED WITH NETWORK ACTIVITY WITH REDUCED RESOURCE UTILIZATION" under Attorney Docket Number 7055752001 and is filed on Aug. 21, 2007. Both applications are assigned to the same assignee—InMon Corporation, doing business at 580 California Street, Fifth Floor, San Francisco, Calif. 94104. The content of the aforementioned patent application is incorporated by reference in its entirety into this Application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND AND SUMMARY

Various embodiments of the present invention relates to methods and apparatus for determining one or more common factors or one or more causes which explain one or more threshold notifications in a data communications network.

Network traffic monitoring is a vital part of network management. A network typically comprises two or more devices which are connected together using some form of communication medium. For example, in a computer network, two or more processing nodes may be connected to, either wirelessly or by wire(s), one or more network devices such as routers or switches which are in turn connected to other network devices. These devices and nodes may also be connected to some non-processing devices such as network printers, facsimile machines, or other resources to share these devices and resources. As another example, a telecommunication network may comprise two or more telecommunications links and nodes such that one or more messages may be transmitted from one part of the telecommunication network to another through one or more links and nodes. In fact, in a typical network, whether computer network, telecommunications network, or other types of network, most activities would produce some network traffic.

On the other hand, a network constitutes a resource which is shared among the nodes. Such resources normally have certain bandwidth limitations on the amount of information that may be transmitted at any given instant in time. That is, the more network resource that one or more nodes on a network utilize at a given instant in time or during a period of time, the less amount of such a shared network resource will be available for the other nodes on the same network at the same instant or during the same period in time. In other words, these other nodes on the same network may be adversely affected if the network is overloaded with existing network traffic.

As a result, monitoring network traffic provides important information for the smooth operation of a network. Monitoring network traffic may also be essential for operating cost allocation, network capacity planning, fault detection and isolation, security management, or service quality analysis.

A common practice for monitoring network traffic is to maintain one or more counters which relate to the amount of information being transmitted across the entire network. More particularly, the network may employ methods or apparatus to measure the amount of activities on each link, through each node or device, or across the entire network. For example, the methods or apparatus may periodically sample the one or more counters and determine the differences or changes in each of the one or more counters. Such differences or changes in each of the one or more counters may be configured or defined to indicate the amount of network traffic during the sampling period. After the sampling process, some current approaches may proceed further to determine one or more thresholds for each of the one or more counters. These thresholds define the levels of network traffic beyond which may cause performance issues or other negative impacts. These approaches may then generate a notification once it is determined that certain thresholds have been exceeded.

In the past, a large number of nodes may be connected to a network with shared resources. In this type of network, a single device connected to the network may be sufficient to monitor all the traffic. Nowadays, this may not be the case as networking has become more complicated. For example, a computer network may contain several network segments, each of which constitutes a portion of the network wherein every device communicates using the same physical layer. In such a computer network, nodes or devices operating at layer two (the data link layer) or higher layers create new physical layers and create other network segments. In such a network, responding to threshold notifications may be quite challenging.

Network management system or administrator often identifies the causes or factors which contribute to network activities. For example, the network management system may identify the causes or factors contributing to network activities by using numerous ways to obtain information about packets transmitted in the computer network. Commonly, a network probe may be attached to the computer network and monitor packets transmitted across the computer network. Alternatively, network elements such as, but not limited to, wireless access points, switches, routers, and hosts may be used to monitor packets transmitted through these network elements and to report on the traffic with technologies such as sFlow, Netflow, IPFIX, or RMON.

For example, in order to identify a cause of such a threshold notification which often corresponds to a network violation, it may be required to examine the communications or transmitted information which traverses the adversely affected network resources. In a modern computer network containing multiple network devices, the network may generate simultaneous threshold notifications. Although some of the threshold notifications may be initiated by causes totally independent from or irrelevant to each other, some other threshold notifications may nonetheless be related and thus make the identification of a cause of a threshold notification even more difficult.

Currently, identifying and analyzing the causes of the threshold notifications often requires a manual analysis of the traffic through each of the nodes or device along the communication path which leads to the generation of threshold notifications. Such an approach not only relies heavily on the experience and expertise of network administrators or whoever is responsible for monitoring the network traffic but also runs the inherent risk of inaccurately identifying or misidentifying the causes of such threshold notifications.

As such, it is an objective of various embodiments of the present invention to provide a method and an apparatus to efficiently identify the causes or factors of excessive network activities such that prompt control actions may be taken to mitigate the adverse effects on network performance. It is another objective of various embodiments of the present invention to provide periodic updates of counters and information on the information being transmitted across the entire network to aid the identification of factors or causes for such threshold notifications.

BRIEF DESCRIPTION OF THE FIGURES

The accompanying drawings are included to provide a further understanding of the invention and, together with the Detailed Description, serve to explain the principles of the invention.

DETAILED DESCRIPTION

Various embodiments of the present invention are generally directed to a method, system, and computer program product for identifying one or more factors or causes which explain the one or more threshold notifications. In one embodiment, the method or the system of the present invention first identifies one or more network components within a network and then identifies which of the one or more network components is overloaded or causing the threshold to trip. The method or the system then identifies one or more factors for the identified network components where the one or more factors constitute one or more causes for overloaded or abnormal network activity. Thereafter, the method or the system then determines a scaled composite weight for a factor so as to determine whether the scaled composite weight exceeds a second threshold. If certain factors are determined to exceed the second threshold, such factors are added to a list of common factors which are in turn stored in a tangible computer accessible medium. In some embodiments of the present invention, a common factor may also be deemed as a significant factor reflecting network activities attributable to the factor. In one embodiment of the present invention, the factors may be determined from the information transmitted. For example, the factor may be determined by the packets transmitted across the network.

Figure 1:
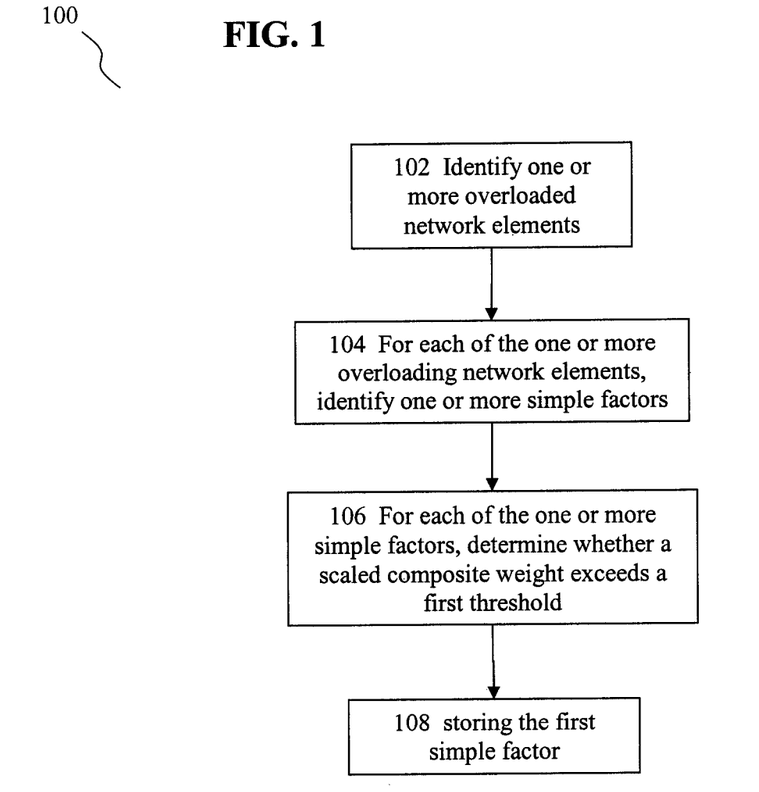
FIG. 1 illustrates a block diagram of the method or system for identifying a factor explaining network threshold notification in some embodiments of the present invention.

Referring to FIG. 1 which illustrates a block diagram of the method or system for identifying a factor explaining network threshold notification in some embodiments of the present invention. At 102, the method or system of some embodiments of the invention first identifies one or more overloaded network components within the network of interest. Once the one or more overloaded network components are identified, the method or system of some embodiments of the invention then, for each of the one or more overloaded network components, identifies one or more factors at 104. A factor constitutes a cause which explains overloaded network activity or network violations. These factors may be extracted or determined from the information transmitted across the network. For example, in a computer network, these factors may be extracted or determined from the packets transmitted across the computer network. In some embodiments, a factor may be a simple attribute or a combination of attributes of one or more packets transmitted within a computer network. In various embodiments, factors may comprise one or more simple factors or one or more combinations of related factors. In some embodiments for a computer network, factors may therefore constitute one or more simple attributes or one or more combinations of attributes of one or more packets transmitted within the computer network. Simple factors may comprise, for example, the source addresses, the destination addresses, and transfer protocols in a computer network. A combination of factors may comprise, taking a computer network as an example, a combination of destination address and a protocol during a denial of service (DoS) attack.

Referring back to FIG. 1. Once the one or more factors have been identified for each of the overloaded network components, the method or system of some embodiments of the invention determines whether a scaled composite weight of a first factor exceeds a second threshold at 106. If the scaled composite weight of the first factor is determined to have exceeded the second threshold, the method or system of some embodiments of the invention then stores the first factor to a list of common factors. In one embodiment of the present invention, a common factor is defined to be a cause or a factor which causes the network activity to exceed certain threshold level.

In another embodiment of the present invention, once the common factors have been identified, the method or the system may then take certain actions such as generating one or more threshold notifications to either the network management system or administrator or individual overloaded network components.

Figure 2:
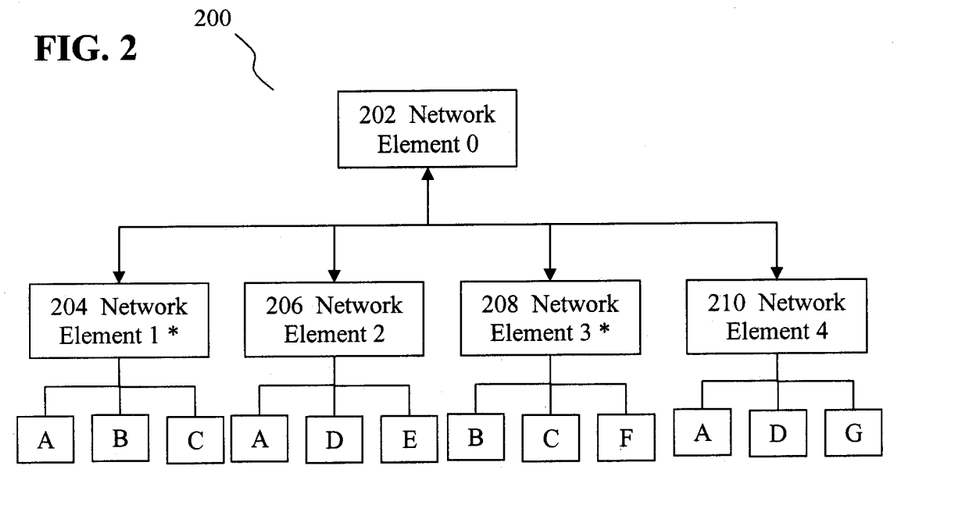
FIG. 2 illustrates a network comprising a plurality of network components connected to each other for explanation purposes.

Referring to FIG. 2 which illustrates a network 200 which comprises a plurality of network components connected to each other. It is noted that the network 200 represents a simplified network for the ease of explaining the method and system as depicted in FIG. 1 and the corresponding text. It is further noted that the actual implementation of various embodiments of the method or system as described in FIG. 1 and its corresponding text should not be limited to such a network as shown in FIG. 2.

The network 200 comprises several network components, 202, 204, 206, 208, and 210, which are connected to each other. For example, network component 202 may be a router or a switch within a computer network. Network components 202, 204, 206, and 208 may constitute processing nodes within the same computer network. The line segments between these network components constitute communication paths within the network. A through G enclosed in square boxes indicated factors for the network components. For example, factors A, B, and C are identified for network component 204, factors A, D, and E are identified for network component 206, factors B, C, and F are identified for network component 208, factors A, D, and G are identified for network component 210. The asterisks within network components 204 and 208 indicate that these two network components are determined to be overloaded with network activities.

Based on the method or system as described in FIG. 1, the method or system first identifies the overloaded network components, 204 and 208 in this example. For example, in some embodiments of the present invention, the method or the system may determine the transmission rate at or through each of the network components and compare the respective rate of each network component to a threshold requirement to determine whether a specific network component is overloaded. Then the method or the system then identifies the factors, A, B, and C for the overloaded network component 204 and factors B, C, and F for the overloaded network component 208.

Thereafter, the method or system then determines, for each of the factors identified, A, B, C, and F, whether a scaled composite weight of a particular factor exceeds a second threshold. For example, a network management system or administrator may predefine such a threshold beyond which the particular factor constitutes a common contributor or network activity. If the method or system determines that the scaled composite weight of a particular factor exceeds the second threshold, the method or system then stores that particular factor in a list of common factors. The method and system then continues to examine all the factors identified above for all the overloaded network components to identify all the common factors.

Figure 3:
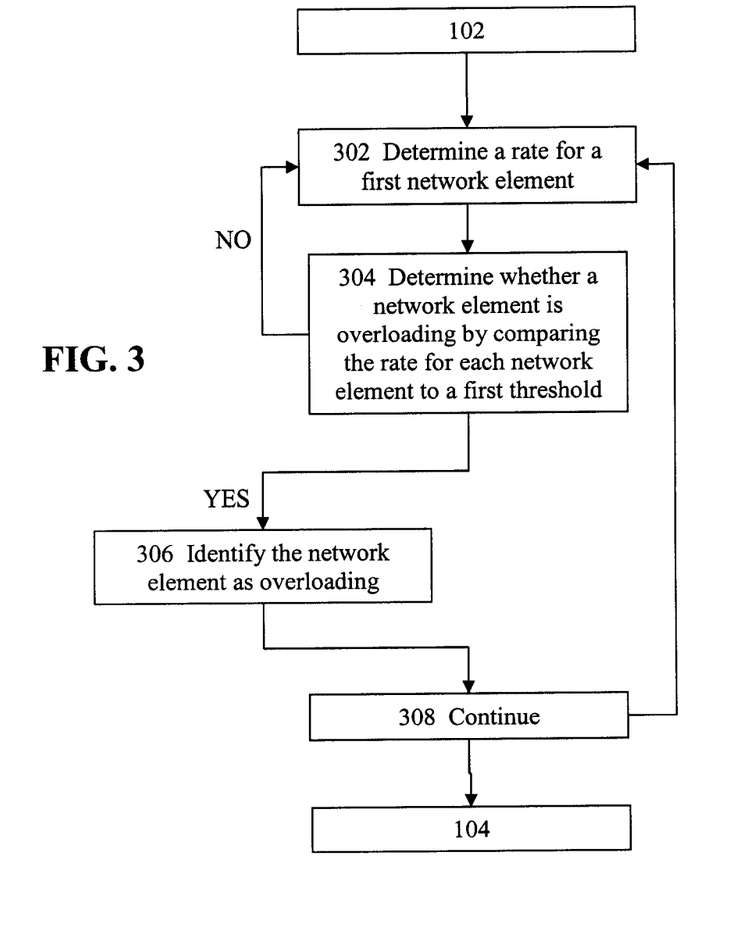
FIG. 3 illustrates further details of the action of identifying one or more overloaded network components.

Referring to FIG. 3 which illustrates further details of the action of identifying one or more overloaded network components at 102. In some embodiments of the present invention, the method or the system may first calculate a rate for each of the network components within the network at 302. In one embodiment of the invention, the rate may constitute a packet rate. In another embodiment of the present invention, the rate may constitute the error rate. Yet in another embodiment of the present invention, the rate may constitute utilization rate of a network resource. In some embodiments of the present invention, the method or the system utilizes the sFlow measurement technology as described in U.S. Pat. No. 6,894,972 and U.S. Pat. No. 7,164,657 both of which are incorporated by reference in the entirety into this application.

In these embodiments of the present invention, the method or the system performs periodic sampling of the network components to provide the network management system or the network administrator with periodic updates of one or more counters from the network components. In some embodiments, the periodic sampling may be time based. In other embodiments of the present invention, the periodic sampling may be packet based.

Referring back to FIG. 3. Once the rate for each of the network components has been determined, the method or the system of some embodiments of the present invention then determines whether a particular network component is overloaded at 304. In one embodiment of the present invention, the method or the system determines whether a particular network component is overloaded by comparing the rate for that particular network component with a first threshold. In one embodiment, the first threshold may represent a certain level of network activities beyond which a network component is determined to be overloaded. If a particular network component is determined to be overloaded, that particular network component is determined as such in 306. Then the method or the system of some embodiments of the present invention then continues, 308, to perform the same for the next network component until all the network components have been determined whether each of these network components is overloaded. Where a network component is determined to be not overloaded at 304, the method and system then goes back to 302 to process the next network component. Once all the network components within the network have been processed, the method or the system then continues to 104 as described above.

Figure 4:
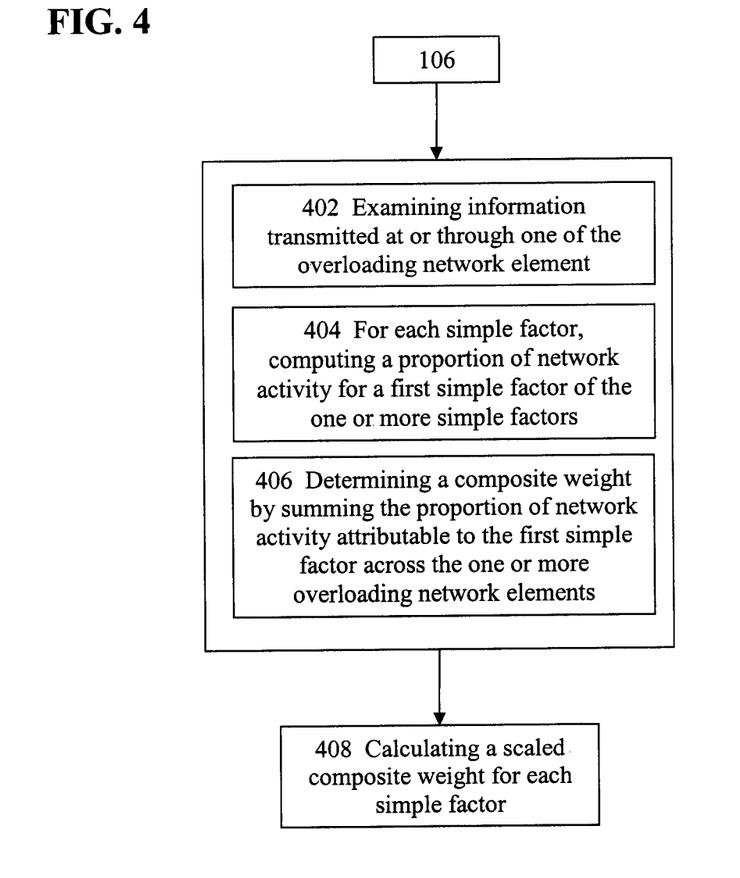
FIG. 4 illustrates more details of the action of determining whether a scaled composite weight exceeds a second threshold.

Referring to FIG. 4 which illustrates more details of the action of determining whether a scaled composite weight exceeds a second threshold at 106. At 402, in some embodiments of the present invention, the method or the system examines the information transmitted at or through the one or more overloaded network components previously identified. The method or the system of some embodiments of the present invention computes a proportion of the network activity attributable to the first factor of the one or more factors for the one or more overloaded network components at 404. In one embodiment of the present invention, the proportion of the network activity attributable to the first factor is expressed as a number between 0 and 100.

At 406, the method or the system of some embodiments of the present invention determines a composite weight for the first factor by adding each proportion of network activity attributable to the first factor across the one or more overloaded network components previously identified. At 408, the method or the system of some embodiments of the present invention then determines the scaled composite weight for the first factor by dividing the composite weight for the first factor by the number of overloaded network components. In one embodiment of the present invention, the scaled composite weight of the first factor may be expressed as a number between 0 and 100. In other embodiments of the present invention, the scaled composite weight may also be determined by assigning different weights to different overloaded network components and calculating the scaled composite weight as a weighted average over these overloaded network components. Yet in another embodiment, assignment of weights to overloaded network components may be specified in a policy table.

Figure 5:
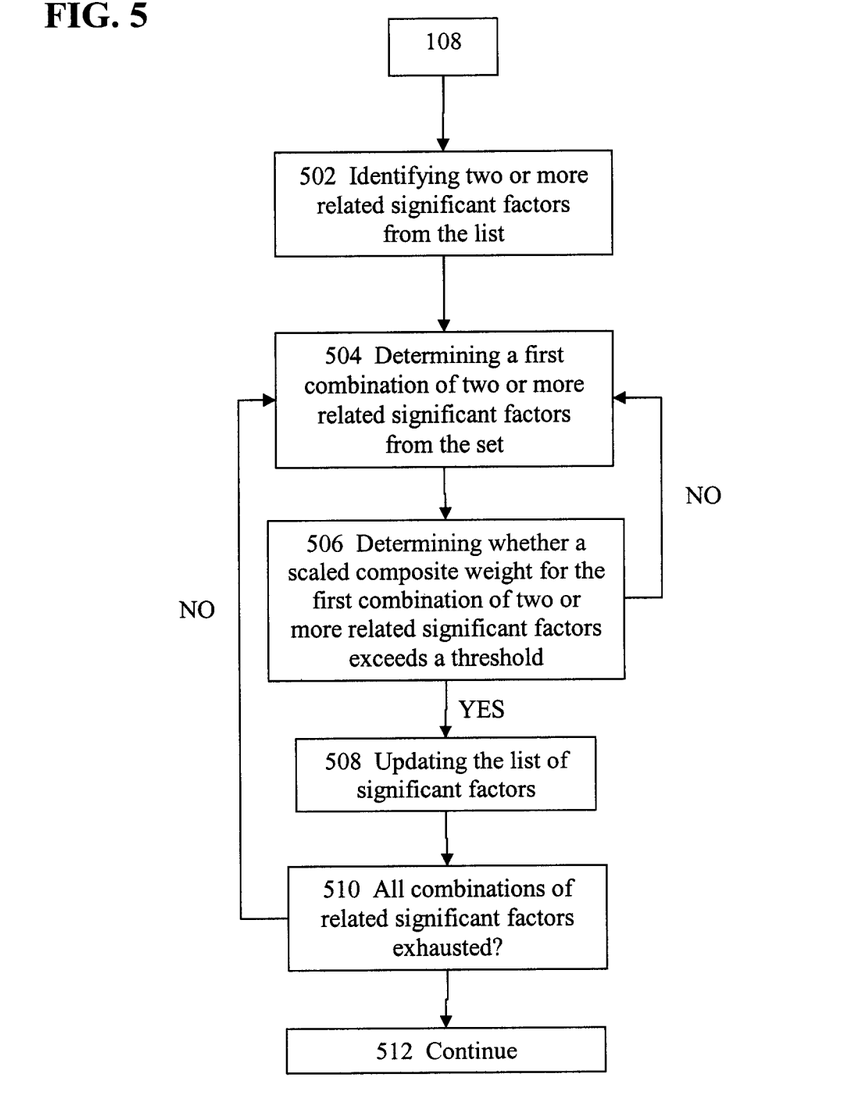
FIG. 5 illustrates a block diagram for applying the method or the system to accommodate multi-factor analysis in various embodiments of the present invention.

Referring to FIG. 5 which illustrates the application of the method or the system described above to perform multi-factor analysis in various embodiments of the present invention. In one embodiment of the present invention, once the common factors have been determined at 108 of FIG. 1, at 502, the method or the system in some embodiments of the present invention then identifies a set of two or more related common factors from the list of common factors previously identified at 108. Two common factors may be determined to be related if they jointly contribute to one or more network activities which cause one or more network component to overload. Two common factors may also be determined to be related if they correspond to one or more network activities arising from one or more system calls, applications, or processes.

At 504, the method or the system of some embodiments of the present invention then determines a first combination of two or more related common factors from the set. In one embodiment of the present invention, the method or the system may perform combinatorial analysis to determine the combinations of such common factors from the identified set. At 506, the method or the system of some embodiments of the present invention determines whether a scaled composite weight for the first combination of two or more related common factors of the set exceeds a third threshold. Methods similar to those as described above in FIG. 4 and its corresponding text may be used at 506 to determine the scaled composite weight and whether the scaled composite weight exceeds a third threshold.

At 508 where the method or the system of various embodiments of the present invention determines that the first combination of two or more related common factors exceeds the third threshold, the method or the system then updates the list of common factors to store the first combination. At 510, the method or the system of various embodiments of the present invention then determines whether all combinations of related factors have been examined. If the method or the system determines that all combinations of related common factors have been exhausted, the method or the system then proceeds to terminate the multi-factor analysis at 512. On the other hand, if the method or the system determines that not all combinations have been examined, the method or the system then goes back to 504 to select a second combination of two or more related common factors and recursively performs the actions from 504 through 508 until the method or the system determines that all combinations of two or more related common factors have been examined.

Figure 6:
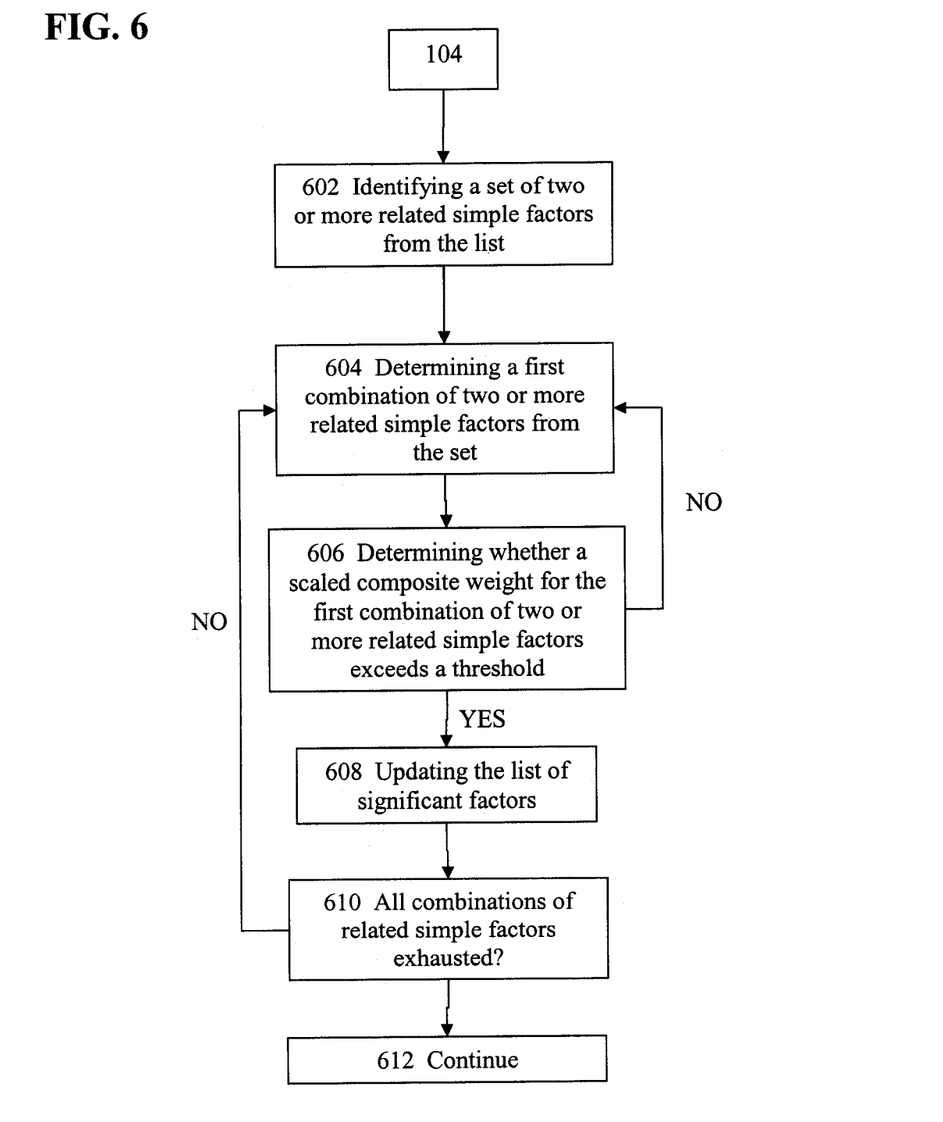
FIG. 6 illustrates a block diagram for applying the method or the system to accommodate another multi-factor analysis in various embodiments of the present invention.

The above multi-factor method or system may alternatively be applied to factors. Referring to FIG. 6 which illustrates the multi-factor process for related factors. Once the one or more factors have been identified at 104, the method or the system in some embodiments of the present invention then identifies a set of two or more related factors at 602. Two factors may be determined to be related if they jointly contribute to one or more network activities. Two common factors may also be determined to be related if they correspond to one or more network activities arising from one or more system calls, applications, or processes.

At 604, the method or the system of some embodiments of the present invention then determines a first combination of two or more related factors from the set. In one embodiment of the present invention, the method or the system may perform combinatorial analysis to determine the combinations of such factors. At 606, the method or the system of some embodiments of the present invention determines whether a scaled composite weight for the first combination of two or more related factors of the set exceeds a fourth threshold. Methods similar to those as described above in FIG. 4 and its corresponding text may be used at 606 to determine the scaled composite weight and whether the scaled composite weight exceeds a fourth threshold.

At 608 where the method or the system of various embodiments of the present invention determines that the first combination of two or more related factors exceeds the third threshold, the method or the system then updates the list of common factors to store the first combination. At 610, the method or the system of various embodiments of the present invention then determines whether all combinations of related factors have been examined. If the method or the system determines that all combinations of related factors have been exhausted, the method or the system then proceeds to terminate the multi-factor analysis at 612. On the other hand, if the method or the system determines that not all combinations have been examined, the method or the system then goes back to 604 to select a second combination of two or more related factors and recursively performs the actions from 604 through 608 until the method or the system determines that all combinations of two or more related common factors have been examined.

The following pseudo code provides an example of implementation of the method as described above.

```
filter = new Filter 0; for each(interface in
n.interfaces0) { if (rate (interface) >
(interface);
         threshold) filter .add~o~ilter
table = getTraffic(filter);
updateFactors = function (nf, update) {
   factors = new HashTable 0;
   totals = new HashTable ( ) ;
   for each(row in table)update(factors, totals, row);
   //   normalize the arrays
   variables = new Set ( ) ;
   for (interface in factors) {
      hash = factors [interface] ;
      for(factor in hash) {
         hash [factor] /= totals [interface] ;
         variables. add (factor);
   //   normalize total weights for each factor var nfactors = new
   HashTableO;
   for (factor in variables) {
      sum = 0;
      for (interface in factors) {
         hash = factors [interface1 ;
         sum += hash [factor] ;
      weight = 100.0 * sum/filter.size( );
      // truncate minor factors
      if (weight > cutoff) nf [factor] = weight;
var update = function(factors,totals,row){ hash = factors [row. interface] ;
if( !hash) {
      hash = new HashTable ( ) ;
      factors [row. interface] = new HashTable ( ) ;
   totals[row.interface] += row.value;
   hash [row. saddress1 += row. value;
   hash [row. sport] += row. value ;
   // don't want to double count
   if(row.saddress != row.daddress) {
   hash [row. daddress] += row .value;
   if (row. sport! = row. dport) {
      hash [row. dport] += row .value;
var nf actors = new HashTable ( ) ;
// second pass to get combinatorial factors
var update2 = function(factors,totals,row) { hash = factors
[row. interface1 ; if( !hash) {
      hash = new HashTable ( ) ;
      factors [ifx1 = hash;
   totals [row. interface1 += row .value;
      if (nf actors [row. saddress] && nfactors [row.dport1) { hash[, row.
         dport,row. saddress1 += row .value; } if (nfactors [row. daddress]
         && nfactors [row.dport1) { hash[row.daddress,row.dport,]+=
         row.value; 1
      if (nf actors [row. daddress] && nf actors [row. sport] )
         { hash[ ,row. sport, row. daddress] += row value; 1
         if (nf actors [row. saddress] && nf actors [row. daddress1 ) {
            if(row.saddress < row.daddress) {
            hash[row.saddress,,row.daddress]+= row.value; } else
            { hash[row.daddress,,row.saddress]+= row.value;
sort (nfactors) ; print
(nfactors) ;
```

SYSTEM ARCHITECTURE OVERVIEW

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 7:
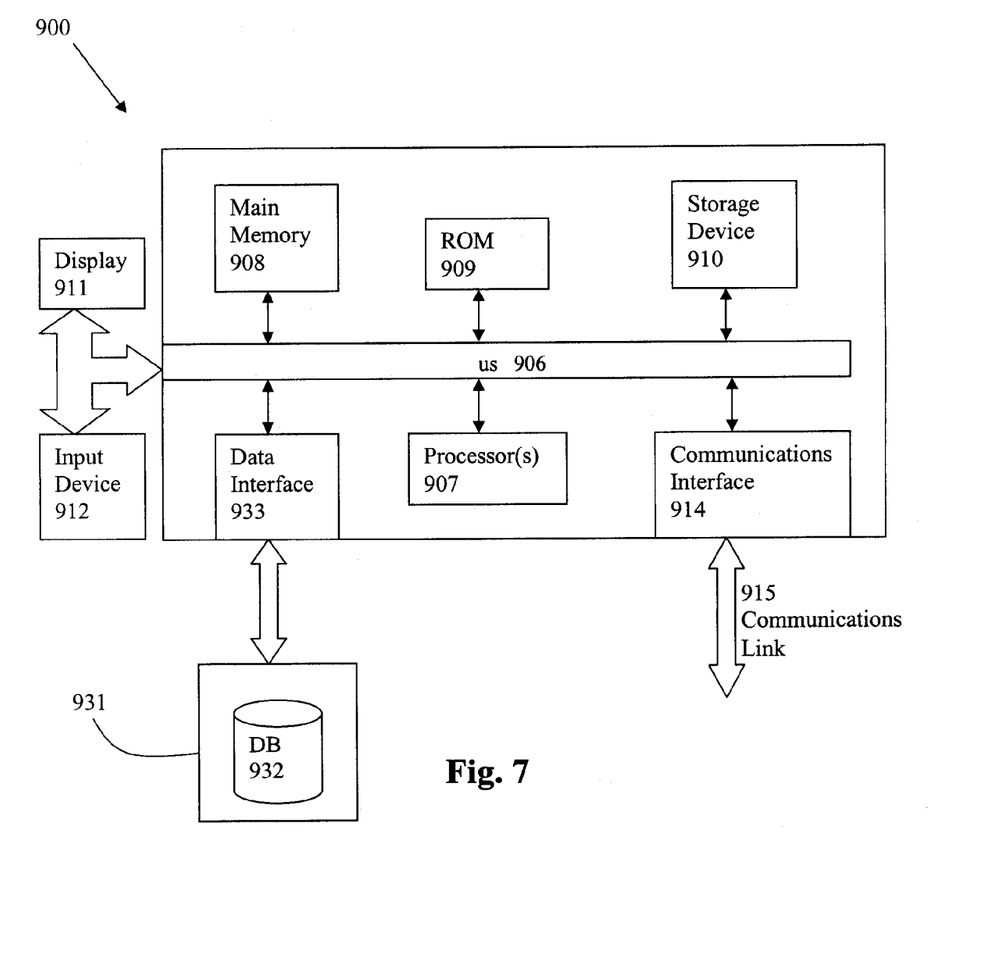
FIG. 7 depicts a computerized system on which a method for timing closure with concurrent process models can be implemented.

FIG. 7 is a block diagram of an illustrative computing system 900 suitable for implementing an embodiment of the present invention. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or ethernet card), display 911 (e.g., CRT or LCD), input device 912 (e.g., keyboard), and cursor control (e.g., mouse or trackball. Not shown.)

According to one embodiment of the invention, computer system 900 performs specific operations by processor 909 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the invention.

In an embodiment, the computer system 900 operates in conjunction with a data storage system 931 that contains a database 932 that is readily accessible by the computer system 900. The computer system 900 communicates with the data storage system 931 through a data interface 933. Some or part of the computer program, data, or information may be stored in the database 932 and may be utilized by the computer system 900 via the data interface 933.

The term "computer readable medium" or "computer usable medium" as used herein refers to any medium that participates in providing instructions to processor 907 for execution. Such a medium may take many forms, including but not limited to, non-volatile media, and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A machine implemented method for identifying common factors associated with network threshold violations, the machine implemented method comprising:

identifying one or more network components having a transmission rate exceeding a first threshold as overloaded network components;

identifying at least one factor attributable to network activity for each of the overloaded network components;

computing a scaled composite weight for the factor by computing a proportion of the network activity associated with the factor for each of the overloaded network components, and summing a proportion of network traffic in the overloaded network components associated with the factor;

identifying the factor as a common factor if the scaled composite weight exceeds a second threshold value;

storing the common factor in a machine readable storage medium;

identifying at least two related common factors attributable to network activity;

generating a first combination including the related common factors;

determining whether a scaled composite weight for the first combination of the common factors exceeds a third threshold; and storing the first combination if the scaled composite weight for the first combination exceeds the third threshold.

2. The machine implemented method of claim 1 wherein computing the proportion of network activity associated with the factor comprises examining information attributable to the factor transmitted at or through one of the overloaded network components.

3. The machine implemented method of claim 1 wherein computing the scaled composite weight for the factor comprises dividing the scaled composite weight by a number of the overloaded network components.

4. The machine implemented method of claim 1 wherein the scaled composite weight is computed by a weighted average over the overloaded network components.

5. The machine implemented method of claim 4 wherein the weighted average over the overloaded network components is defined in a policy table.

6. The machine implemented method of claim 1 wherein the first combination is determined by combinatory analysis.

7. The machine implemented method of claim 1 wherein the factor is a simple factor.

8. The machine implemented method of claim 1 wherein the at factor is a combination of a plurality of related simple factors.

9. The machine implemented method of claim 1 wherein the factor is a combination of a plurality of related common factors.

10. A system for identifying common factors associated with network threshold violations, the system comprising:

a processor;

a non-transitory computer readable storage medium comprising the following logics to be executed by the processor;

logic for identifying one or more network components having a transmission rate exceeding a first threshold as overloaded network components;

logic for identifying at least one factor attributable to network activity for each of the overloaded network components;

logic for computing a scaled composite weight for the factor, including logic for computing a proportion of the network activity associated with the factor for each of the overloaded network components, and logic for summing a proportion of network traffic in the overloaded network components associated with the factor;

logic for identifying the factor as a common factor if the scaled composite weight exceeds a second threshold value;

logic for storing the common factor in a list of common factors in a tangible machine accessible medium;

logic for identifying at least two related common factors from the list of common factors;

logic for generating a first combination including the related common factors;

logic for determining whether a scaled composite weight for the first combination of the common factors exceeds a third threshold; and logic for storing the first combination in the list of common factors if the scaled composite weight for the first combination exceeds the second threshold.

11. A non-transitory computer readable storage medium having stored thereon a sequence of instructions which, when executed by a processor, causes said processor to:

identify one or more network components having a transmission rate exceeding a first threshold as overloaded network components;

identify at least one factor attributable to network activity for each of the overloaded network components;

compute a scaled composite weight for the factor by computing a proportion of network activity associated with the factor for each of the overloaded network components, and summing a proportion of network traffic in the overloaded network components associated with the factor;

identify the factor as a common factor if the scaled composite weight exceeds a second threshold value; and store the common factor in a list of common factors in the computer readable storage medium;

identify at least two related common factors from the list of common factors;

generate a first combination including the related common factors;

determine whether a scaled composite weight for the first combination of the related common factors exceeds a third threshold; and store the first combination in the list of common factors if the scaled composite weight for the first combination exceeds the third threshold.

* * * * *